May 24, 1955  O. B. DIEHL  2,708,953
ADJUSTABLE BUMPER FOR CHAIN SAW MACHINES
Filed March 20, 1953  2 Sheets-Sheet 1
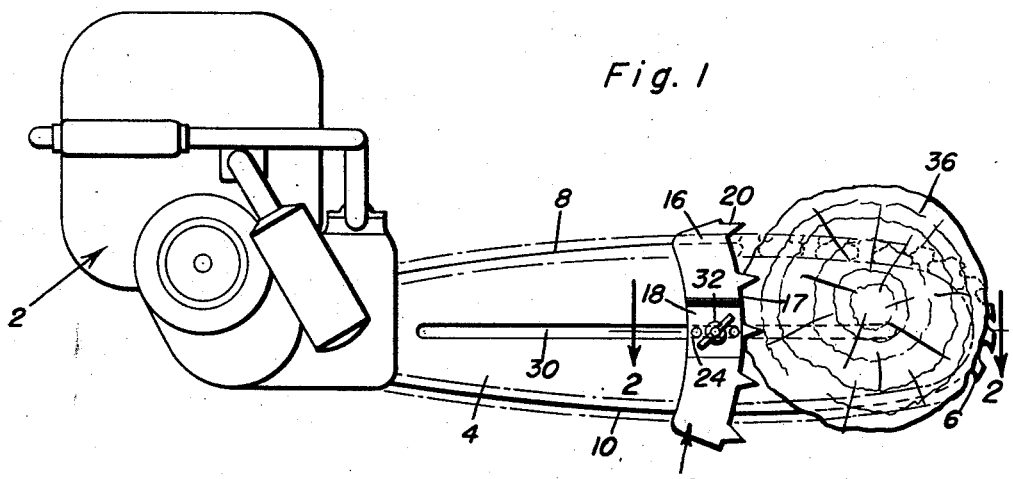
Fig. 1
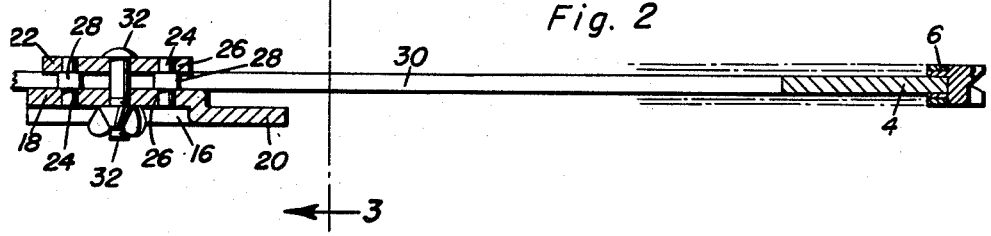
Fig. 2
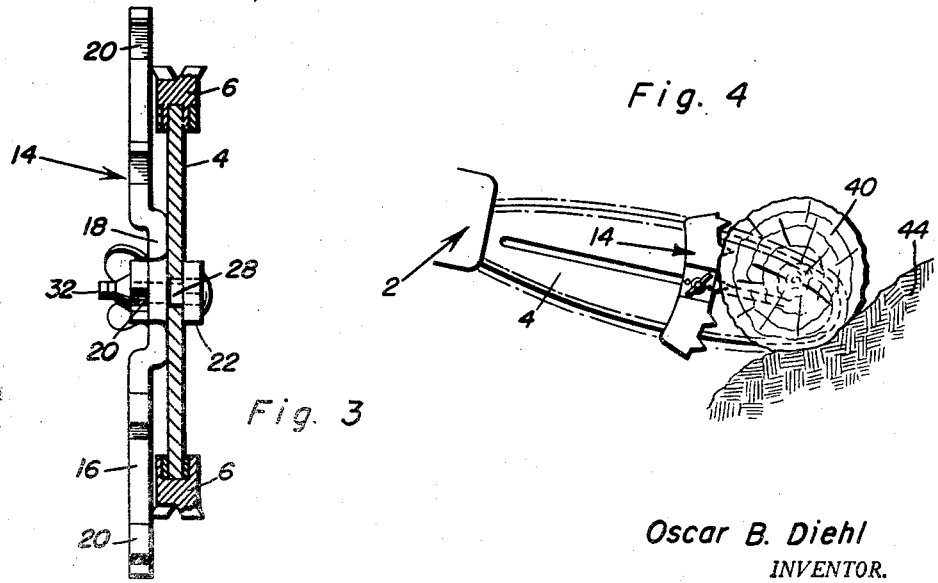
Fig. 3
Fig. 4
Oscar B. Diehl
INVENTOR.

May 24, 1955   O. B. DIEHL   2,708,953
ADJUSTABLE BUMPER FOR CHAIN SAW MACHINES
Filed March 20, 1953   2 Sheets-Sheet 2

Oscar B. Diehl
INVENTOR.

United States Patent Office 2,708,953
Patented May 24, 1955

2,708,953
ADJUSTABLE BUMPER FOR CHAIN SAW MACHINES

Oscar B. Diehl, Lewiston, Idaho

Application March 20, 1953, Serial No. 343,681

1 Claim. (Cl. 143—32)

My invention relates to adjustable bumpers for power driven chain saw machines.

The primary object of my invention is to provide a bumper on the cutting chain guide member of such machines easily adjustable along the member into different set positions to vary the length of the guide member and cutting chain to be used in cross cutting logs on the ground, or the like, and which is adapted to bite into the log and hold the guide member and cutting chain from dropping to the ground in both over and under cutting operations.

Another object is to provide a bumper for the above purpose which is reversible for attachment to either side of the cutting chain guide member.

Still another object is to provide a bumper for the above purposes which is simple in construction, safe to use, and inexpensive to manufacture.

Other and subordinate objects, within the purview of my invention, together with the precise nature of my improvements will be readily understood when the succeeding description and claim are read with reference to the drawings accompanying and forming part of this specification.

In said drawings:

Figure 1 is a view in side elevation illustrating my invention, in the preferred embodiment thereof, applied to the cutting chain guide member of a power driven chain saw machine and illustrating one use of the invention in crosscutting a log shown in end elevation;

Figure 2 is an enlarged view in longitudinal section taken on the line 2—2 of Figure 1 with the log eliminated;

Figure 3 is an enlarged view in vertical transverse section taken on the line 3—3 of Figure 2;

Figures 4, 5 and 6 are fragmentary diagrammatic views in side elevation with the log in end elevation illustrating other uses of the invention.

Figure 5:
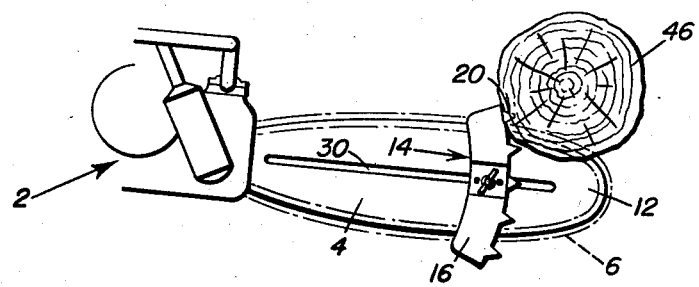

Referring to the drawings by numerals, my improved bumper has been shown therein as applied to a well known power driven chain saw machine, shown conventionally as sufficient for the present purposes, the machine including a motor drive unit 2 from which the usual cutting chain guide member 4 of bar form, and truncated elliptical shape extends with the saw tooth link cutting chain 6 straddling and traveling along the longitudinal top and bottom edges 8, 10 and the front rounded end 12 of said guide member.

The bumper 14 of my invention comprises an elongated, front bumper plate 16 extending endwise transversely of the guide member 4, and having a central rearwardly offset flat portion 18 opposed flat against one side of said guide member 4 and offsetting the remainder of the bumper plate 16 laterally outwardly therefrom and from said member 4 parallel with said member 4. The bumper plate 16 projects at its ends beyond the cutting chain 6 and is formed with an arcuate, convex front longitudinal edge 17 provided with radial flat teeth 20 spaced along the same in a common plane.

The central portion 18 of the bumper plate 16 is mounted on the guide member 4 for sliding adjustment longitudinally of the same to correspondingly adjust the bumper plate 16 by means comprising a clamping plate 22 opposite the central portion 18 on the opposite side of the guide member 4, a pair of guide pins 24 spaced longitudinally of said plates with ends removably fitted in openings 26 in said plates and intermediate enlarged, squared portions 28 slidable in a longitudinal central slot 30 in the guide member 4, and a nut equipped bolt 32 traversing said plates 18, 22 and the slot 30 for tightening said plates 18, 22 against opposite sides of the guide member 4.

Figure 6:
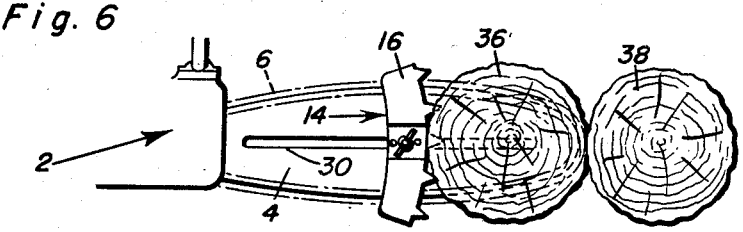
Figure 7:
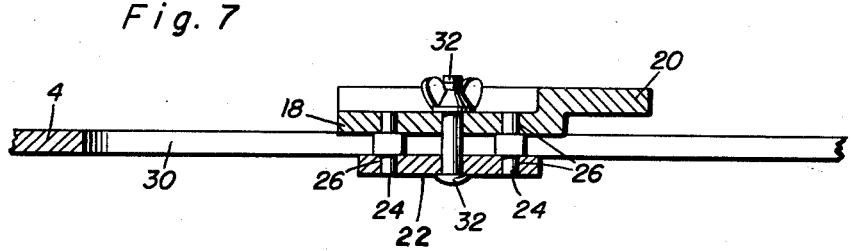
Figure 7 is an enlarged view in longitudinal section illustrating the bumper reversed.

As shown in Figures 1 to 6, the bumper 14 is applied to the right side of the guide member 4. However, and as shown in Figure 7, it may be reversed and applied to the left side of said member 4, if desired.

When over, or down, crosscutting through a log 36 of a given diameter, the bumper 14 is set along the guide member 4 to space the edge 17 of the bumper plate 16 from the front end of the guide member 4 approximately in accordance with the length of said member 4 and that of the cutting chain 6 necessary to cut through the log. By moving the saw machine forwardly, at the proper time, a tooth or teeth 20 on the bumper plate 16 may be embedded in the log 36 and the edge 17 engaged with said log so that the saw machine may be rocked on the embedded tooth, or teeth, as the case may be and on said edge to complete the cut without the cutting chain dropping onto the ground. By using, approximately, only the necessary length of the guide member 4 and the cutting chain 6, the bumper 14 will prevent the front end of the saw machine from cutting into a log 38 behind the log 36, as illustrated in Figure 6. As shown in Figure 4, the bumper 14 will prevent the cutting chain 6 from digging into a hillside 44, or rock or earth supporting a log 40 on the hillside.

As shown in Figure 5, a log 46 may be undercut, when properly supported, with a tooth 20 forced into the log so as to suspend the guide member 4 and cutting chain 6 for fulcruming action on the log so that cutting may be completed without the operator holding the guide member 4 and cutting chain up against the log.

As will be clear, the edge 17 provides for easy rocking of the saw machine with said edge riding a log. As will also be manifest, by having the bumper plate 16 offset from the guide member 4 embedding the teeth 20 in the log and positioning the edge 17 against the log is facilitated.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

What is claimed as new is as follows:

In a chain saw machine having a chain driving power unit and a chain supporting bar extending from said unit with an endless chain running on the edge thereof, a bumper plate for engagement with a log having a central rearwardly offset portion opposed flat against one side of said bar, and an arcuate toothed log engaging edge, and means for attaching said offset portion to said bar for sliding adjustment of said bumper plate along said bar comprising a clamping plate engaging the opposite side of said bar opposite said offset portion, said bar having a longitudinal slot therein, a pair of guide pins spaced longitudinally of said slot with rounded ends extending through said offset portion and clamping plate and enlarged rectangular central portions fitting in said slot, and a nut equipped bolt extending through said offset portion, slot and clamping plate.

References Cited in the file of this patent

UNITED STATES PATENTS

| | | |
|---|---|---|
| 1,349,632 | Staley | Aug. 17, 1920 |
| 2,463,860 | Foster | Mar. 8, 1949 |
| 2,567,886 | Mall et al. | Sept. 11, 1951 |
| 2,630,844 | Abbott et al. | Mar. 10, 1953 |